(12) United States Patent
Hera et al.

(10) Patent No.: US 7,058,026 B1
(45) Date of Patent: Jun. 6, 2006

(54) INTERNET TELECONFERENCING

(75) Inventors: Cristian M. Hera, Framingham, MA (US); Bruce C. Levens, Wayland, MA (US); R. Brough Turner, Newton Corner, MA (US)

(73) Assignee: NMS Communications Corporation, Framingham, MA (US)

( * ) Notice: Subject to any disclaimer, the term of this patent is extended or adjusted under 35 U.S.C. 154(b) by 841 days.

(21) Appl. No.: 09/684,091

(22) Filed: Oct. 6, 2000

(51) Int. Cl.
*H04L 12/16* (2006.01)

(52) U.S. Cl. ...................................... 370/265; 370/266
(58) Field of Classification Search ................ 370/260, 370/265–269, 263; 379/203.01, 204.01; 348/14.09
See application file for complete search history.

(56) References Cited

U.S. PATENT DOCUMENTS

| | | | | |
|---|---|---|---|---|
| 4,998,243 A | * | 3/1991 | Kao ............................ | 370/264 |
| 5,436,896 A | * | 7/1995 | Anderson et al. ........... | 370/260 |
| 5,768,263 A | * | 6/1998 | Tischler et al. ............. | 370/263 |
| 5,828,838 A | * | 10/1998 | Downs et al. ............... | 709/204 |
| 5,898,675 A | | 4/1999 | Nahumi ....................... | 370/260 |
| 5,936,662 A | | 8/1999 | Kim et al. .................... | 348/15 |
| 5,949,760 A | * | 9/1999 | Stevens et al. ............. | 370/254 |
| 6,163,531 A | * | 12/2000 | Kumar ........................ | 370/260 |
| 6,205,124 B1 | * | 3/2001 | Hamdi ......................... | 370/260 |
| 6,625,773 B1 | * | 9/2003 | Boivie et al. ............... | 714/749 |
| 6,662,211 B1 | * | 12/2003 | Weller ......................... | 709/204 |
| 6,735,168 B1 | * | 5/2004 | Schnell et al. .............. | 370/217 |

* cited by examiner

*Primary Examiner*—Chau Nguyen
*Assistant Examiner*—Ian N. Moore
(74) *Attorney, Agent, or Firm*—Mintz, Levin, Cohn, Ferris Glovsky and Popeo, P.C.; Shane H. Hunter

(57) ABSTRACT

A conferencing system includes an input configured to receive N encoded speech signals from N terminals, and a signal processing arrangement configured to determine L encoded signals, of the N encoded speech signals, each indicative of an amount of sound that is louder than amounts of sound indicated by signals of the N encoded signals other than the L signals, the signal processing arrangement being further configured to produce at least N minus L sets of signals similar to the L signals and to transmit at least a set of the similar signals toward each of the terminals other than the terminals from which the L signals were received.

16 Claims, 4 Drawing Sheets

INTERNET TELECONFERENCING

FIELD OF THE INVENTION

This invention relates to teleconferencing and more in particularly to conference calling over packet-based networks.

BACKGROUND OF THE INVENTION

Teleconferencing is a very popular means of communication in today's society. Persons in different locations, e.g., in the building next door, down the street, across the state or around the world, can communicate audibly and sometimes visually in the same conference by means of conference calling. In the typical conference call, multiple persons communicate over multiple lines that are all interconnected and carry all participants' voices. Because all persons can be speaking at a given time, and noise or other sounds from all sources are received by all participants, it can be difficult to distinctly hear the loudest talkers clearly.

Teleconferencing can be accomplished using a variety of techniques. For example, one of the participants in the call can originate multiple calls to the respective parties to be involved in the conference call. Alternatively, the participants may all call a common teleconferencing service that connects all of the incoming calls, for a particular conference, to each other. Audio and visual information for teleconferences can be carried over packet-based networks such as the global packet-based network known as the Internet.

Referring to FIG. 1, previous systems have used a conference bridge that received and output packetized data. Packetized data representing speech from N talkers was received and decoded by decoders. The decoded signals were transmitted to logic that selected the L loudest talkers. The signals for the L loudest talkers were mixed in the conference bridge and encoded and packetized. The encoded and packetized data were sent over a packet-data network toward receivers.

SUMMARY OF THE INVENTION

In general, in one aspect, the invention provides a conferencing system including an input configured to receive N encoded speech signals from N terminals, and a signal processing arrangement configured to determine L encoded signals, of the N encoded speech signals, each indicative of an amount of sound that is louder than amounts of sound indicated by signals of the N encoded signals other than the L signals, the signal processing arrangement being further configured to produce at least N minus L sets of signals similar to the L signals and to transmit at least a set of the similar signals toward each of the terminals other than the terminals from which the L signals were received.

Implementations of the invention may include one or more of the following features. The signal processing arrangement is configured to determine the L signals based on amounts of energy in the N signals. The signal processing arrangement is configured to transmit a reduced set of signals toward each of the terminals from which the L signals are received, the reduced set including the L similar signals minus the signals similar to the signals received from the terminals toward which the reduced set is being transmitted. The signal processing arrangement is configured to transmit the signals toward the terminals in an unmixed format. The N signals include packets having data portions and headers, and the signal processing arrangement is configured to alter the headers of the packets to transmit the packets toward appropriate terminals.

In general, in another aspect, the invention provides a method including receiving N encoded first telecommunications signals from N terminals, selecting L loudest signals from the N signals, producing second telecommunications signals that are similar to the L signals, and transmitting the second signals toward the terminals other than the terminals from which the L signals were received.

Implementations of the invention may include one or more of the following features. The method further includes determining the L signals based upon amounts of energy in the N signals. The method further includes transmitting, toward each of the terminals from which the L signals were received, the second signals minus each of the second signals similar to the signals received from the respective terminals. The second signals are transmitted toward the terminals in an unmixed format. The first signals contain RTP packets having data portions and headers, the method further comprising altering the headers. L equals one.

In general, in another aspect, the invention provides a conferencing system including an input configured to receive N encoded first speech signals from N terminals, means for selecting L loudest signals from the N signals and producing second telecommunications signals that are similar to the L signals, and an output device configured to transmit, toward the terminals, the second signals.

Implementations of the invention may include one or more of the following features. The output device is configured to transmit the second signals except the second signals, if any, associated with the first signals received from the respective terminals toward which the second signals are transmitted. L equals one. The output device is configured to transmit the second signals in an unmixed format toward the terminals.

In general, in another aspect, the invention provides a computer program product, residing on a computer-readable medium, including instructions for causing a computer to receive N encoded first telecommunications signals from N terminals, select L loudest signals from the N signals, produce second telecommunications signals that are similar to the L signals, and transmit the second signals toward the terminals from which the signals of the N signals other than the L signals were received.

Implementations of the invention may include one or more of the following features. The computer program product further includes instructions for causing a computer to determine the L signals based upon amounts of energy in the N signals. The computer program product further includes instructions for causing a computer to transmit, toward each of the terminals from which the L signals were received, the second signals minus the second signal similar to the signal received from the respective terminal. The instructions for causing the computer to transmit the second signals are configured to cause the computer to transmit the second signals toward the terminals in an unmixed format. The first signals contain RTP packets having data portions and headers, the computer program product further comprising instructions for causing a computer to alter the headers.

Various aspects of the invention may provide one or more of the following advantages. Delay of teleconferencing signals can be reduced compared to techniques that encode and decode at a conference bridge. Speech quality of transmitted telecommunication signals can be improved compared to techniques employing decoding and encoding at a conference bridge. A conference bridge can process signals without decoding or encoding the signals. Delay in telecommunications can be reduced compared to techniques that mix teleconferencing signals at a conference bridge. A conference bridge can process signals without mixing the signals or encoding mixed signals.

These and other advantages of the invention, along with the invention itself, will be more fully understood after a review of the following drawings, detailed description, and claims.

DETAILED DESCRIPTION OF PREFERRED EMBODIMENTS

Embodiments of the invention provide techniques for processing telecommunications data for conference calling. Multiple calls are connected through lines to an Internet Protocol (IP) conference bridge. The conference bridge determines which of the incoming calls are the loudest. The L (where L is an integer) loudest signals are selected and transmitted from the conference bridge. The L loudest signals are sent to the participants in the teleconference that are not among the L loudest callers. The L loudest callers receive each of the L signals except the signal originating from itself. This helps prevent undesired echo from being received by the L loudest callers.

Figure 1:
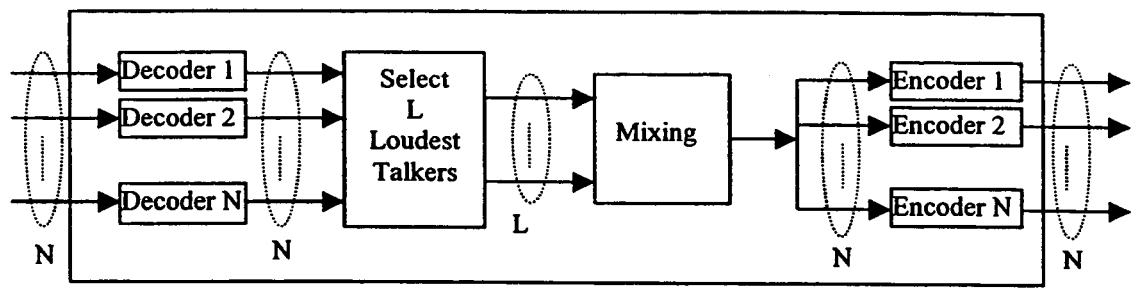
FIG. 1 is a block diagram of a prior art conference bridge.
Figure 2:
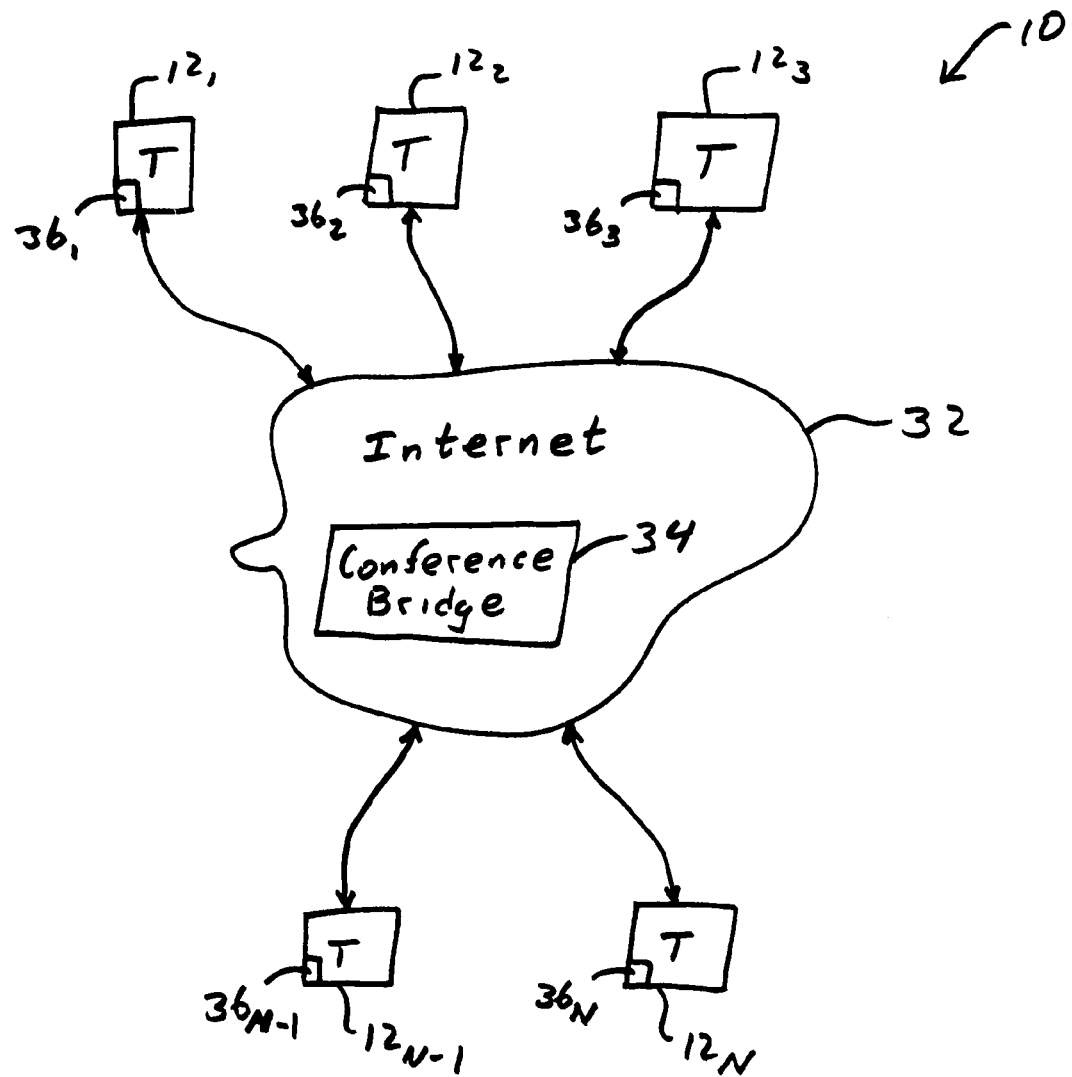
FIG. 2 is a block diagram of a telecommunications system according to the invention.

Referring to FIG. 2, a telephony system 10 includes IP terminals $12_1$, $12_2$, ... $12_N$, and a Packet-based communications network 32, here the global packet-based network known as the Internet including a conferencing bridge 34. While only five terminals 12 are shown in FIG. 2, more, or fewer, terminals 12 may participate in a teleconference according to the invention. The terminals 12 are connected for bi-directional communication with the Internet 32 and are configured to communicate with the Internet 32 in a digital format. The conference bridge 34 is coupled for bi-directional communication in a digital format with the terminals 12 via the Internet 32.

The terminals 12 are configured to transmit information to the conference bridge 34 and to receive multiple lines of communication from the conference bridge 34, each line carrying a signal. Each terminal 12 may include a mute capability that enables a user to mute (e.g., by pushing a mute button) the terminal 12 such that the terminal 12 does not transmit a signal or transmits a null signal. Each terminal 12 also includes an encoder to encode the information transmitted to the conference bridge 34. The encoders of different terminals 12 can encode packets of different frame sizes. Also, the encoder for a terminal 12 can be different than the encoder(s) of other terminals 12, and encode data differently than other encoders. Each terminal 12 also includes a jitter buffer to help accommodate for different arrival times of incoming packets. The terminals 12 are configured to use the jitter buffer to help convert incoming asynchronous packet data, including bursts of packet data, to synchronous output data. Each terminal 12 also has at least one decoder to decode incoming data. Each terminal 12 can have a group of decoders configured to decode data encoded by the different encoder types of the terminals 12. A mixer 36 included in each of the terminals 12 is configured to mix the decoded incoming signals by summing the decoded incoming signals.

The conference bridge 34 is an IP system including appropriate processing apparatus. The system includes a central processing unit (CPU) configured to perform the functions described below related to determining/selecting loudest signals, replicating the loudest signals and transmitting replicated signals. Here, this CPU is a programmed Digital Signal Processor (DSP). Alternatively, the CPU could be a general purpose processor such as a Reduced International Set Computer (RISC) processor or an, e.g., IBM-compatible processor such as a Pentium® processor. Alternatively still, the CPU can be implemented using a dedicated Application-Specific Integrated Circuit (ASIC).

Figure 3:
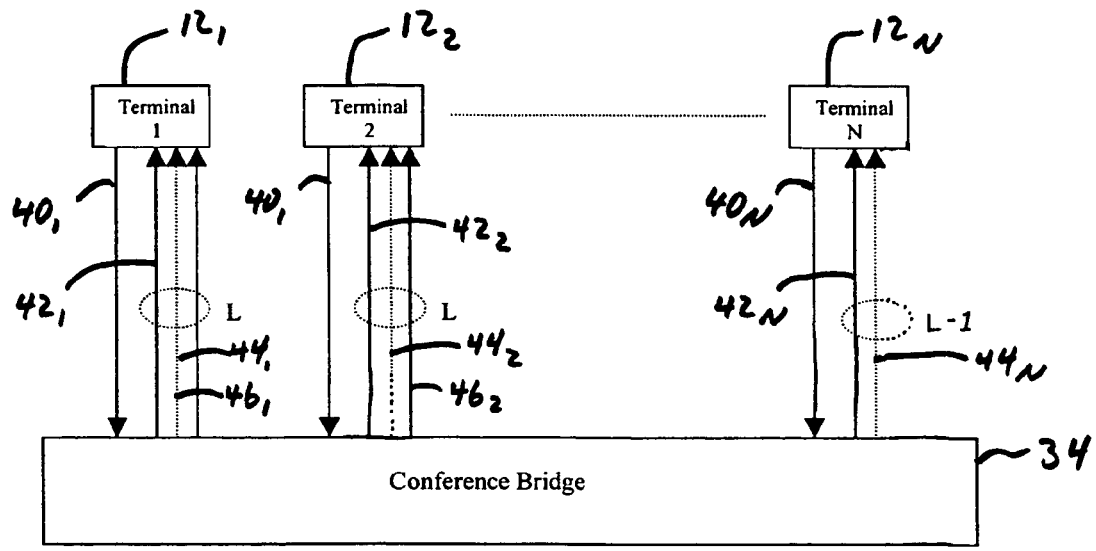
FIG. 3 is a simplified block diagram illustrating communication between a conference bridge and terminals shown in FIG. 2.

Referring to FIG. 3, the conference bridge 34 is schematically shown coupled to several, here N, terminals $12_1$, $12_2$, ..., $12_N$. The representation shown in FIG. 3 is schematic in that the conference bridge 34 is shown directly coupled to the terminals 12, although the connection is in reality not a direct connection for the system 10 as shown in FIG. 2. For purposes of the following discussion, however, it is sufficient to view the connections between the conference bridge 34 and the terminals 12 as direct connections. As shown, each of the terminals 12 is coupled and configured to transmit a signal from the terminal 12 to the conference bridge 34 as indicated by arrows $40_1$, $40_2$, ... $40_N$. The conference bridge 34 is also coupled to the terminals 12 to transmit L signals of information to the terminals 12 as indicated by arrows 42, 44, 46. The L represents a number that is equal to or smaller than the number N. Thus, the conference bridge 34 is configured to receive N signals and convey a set, that may be a subset, of those signals to the terminals 12, where the set contains L signals. For L of the terminals 12, only one shown here, L-1 signals are conveyed to that terminal 12, here terminal $12_N$. This helps prevent echoes at certain of the terminals 12 as described more fully below.

The conference bridge 34 is configured to process signals received from the terminals 12 and return signals to the terminals 12. The bridge 34 is configured to return signals to the terminals 12 similar to how they arrive at the bridge 34. Thus, if a burst of packets is received by the bridge 34, then a burst of data is output by the bridge 34 (if the burst is associated with one of the loudest signals). The terminals 12 are configured to transmit one signal (or no signal, e.g., if the terminal 12 is muted) of information to the conference bridge 34, and to receive up to L signals of information from the conference bridge 34. The terminals 12 are configured to mix the incoming signals from the conference bridge 34 by summing the incoming signals. The conference bridge 34 is configured to receive N encoded signals from the N terminals 12 at an input. The CPU in the conference bridge 34 is coupled to the input of the conference bridge to receive the N signals. The CPU is programmed to process the N signals and return L signals to N-L of the terminals 12 and return L-1 signals to L of the terminals 12.

Figure 4:
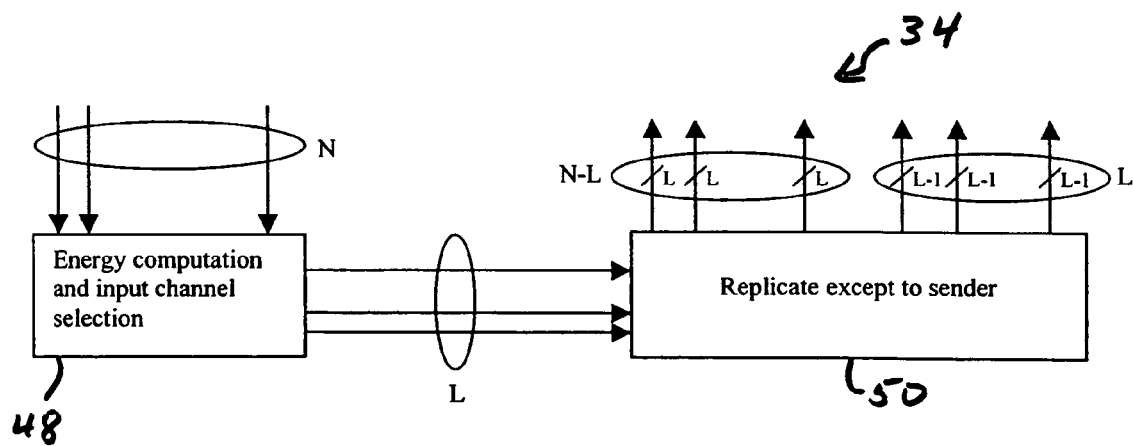
FIG. 4 is a functional block diagram of the conference bridge shown in FIG. 2.

Referring to FIG. 4, the conference bridge 34 can be divided into functional blocks of a line selector 48 and a replicator 50. The selector 48 is connected and configured to transmit L signals to the replicator 50. The selector 48 and replicator 50 can be implemented in the specially-programmed DSP to process the N incoming signals.

The selector 48 is configured to compute the amounts of energy in the N incoming signals. For example, the selector 48 can extract data indicative of the energy of the incoming signals from the bit stream representing the encoded signals, or by at least partially decoding the incoming signals, regardless of the frame sizes of the data. Other techniques for extracting energy data may be employed depending on the type of coding of the incoming signals. The selector 48 is configured to average the amounts of energy of the incoming signals over time t, with samples every $t_2$. Thus, the selector 48 can sample the energy of each of the N incoming signals every $t_2$ and average the sampled energies over approximately $t_1$.

The selector 48 is further configured to analyze the average amount of energy of the N incoming signals and select the L signals indicative of the loudest talkers at the respective terminals 12. The selector 48 can use the average energy levels (e.g., by comparing the energies to a threshold) to determine which incoming signals contain speech. To determine the signals of the loudest talkers, the selector 48 can, e.g., select the L signals having the L highest energy levels of the N incoming signals. The selector 48 is configured to select the L loudest signals by comparing the average amounts of energies over approximately a time $t_3$. Thus, the selector 48 can select the L signals having the highest average energy levels over approximately $t_3$ and transmit these signals to the replicator 50. The selector 48 is configured to select and transmit L signals with the signals remaining in their encoded forms.

The times $t_1$, $t_2$, and $t_3$ are dependent on the application. For example, for operation on streams encoded using G.711, G.723.1, or G.729, $t_1$, can be 200 ms, $t_2$ can be 10–30 ms, and $t_3$ can be 500 ms. Other times and applications are acceptable.

The replicator 50 is configured to replicate or multicast the L loudest incoming signals to form signals similar to the L input signals for transmission to the terminals 12 (FIG. 3). The original L signals may or may not be sent to the terminals 12. For example, the original L signals may be sent to at least one of the terminals 12, or they may be multicast to the N terminals 12, or they may be replicated and the replicas sent to the N terminals 12. If the original L incoming signals to the replicator 50 are used, they may be sent to one of the terminals 12, with the original signals being multicast or replicated and transmitted to the remaining N-1 terminals 12. In any case, signals similar (including identical to) the L incoming signals are transmitted to the terminals 12.

The replicator 50 is configured to selectively send signals to the terminals 12. The replicator 50 is configured to send L similar signals to N-L terminals 12 that are not sources of the L loudest signals. The replicator 50 is further configured to send L-1 of the similar signals to each of the L terminals 12 that were sources of the L loudest signals. For the terminals 12 that originated the L loudest signals, the replicator 50 is configured to send each of the L similar signal except the similar signal corresponding to the signal originating from the respective terminal 12 (i.e., except to the sender of the suppressed/withheld signal. This guards against sending echo signals to the terminals 12 that originate the L loudest signals at any given time.

Figure 5:
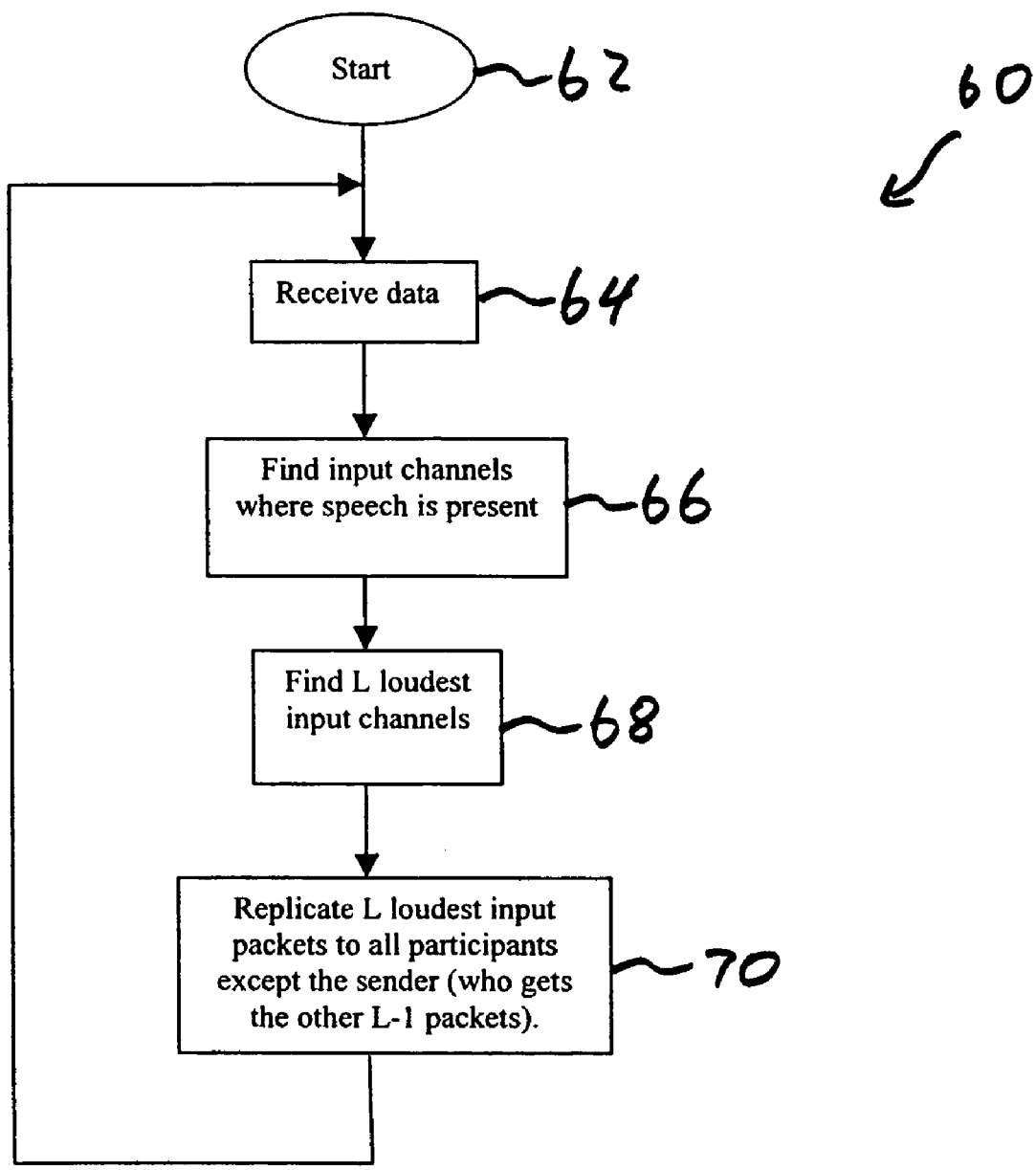
FIG. 5 is a block diagram flow chart of a teleconference process according to the invention.

Referring in particular to FIG. 5, with additional reference to FIGS. 2–4, a telecommunications process 60 starts at stage 62 and proceeds to stage 64 where data are received. The data are received by the conference bridge 34 from the terminals 12 through associated Internet 32 apparatus. The data are received by the conference bridge 34 from N terminals 12.

At stage 66, the selector 48 of the conference bridge 34 finds the input channels where speech is present. The selector 48 determines and analyzes the amounts of energy in the N signals received on the channels. The selector 48 samples the incoming signals approximately every $t_1$ and averages the sampled amounts of energy over approximately $t_2$. From these averaged amounts of energy, the selector 48 determines, e.g., by comparing the average energy amounts to a threshold, which of the N channels contains speech currently. This threshold can be variable and can be computed at call set up based, e.g., on the average energy on each channel to the conference bridge 34.

At stage 68, the selector 48 determines and selects the L loudest input signals. The selector 48 compares average energy amounts of the signals having speech on them over approximately $t_3$, and selects the L signals having the most average energy over the approximately $t_3$ time period. The selector 48 transmits the selected L loudest signals to the replicator 50.

At stage 70, the replicator 50 replicates the L loudest signals received from the selector 48 to produce similar signals (similar to the L loudest signals) for transmission to the terminals 12. The replicator 50 transmits L signals similar to the L received signals to each of the terminals 12 that did not originate one of the selected L loudest signals. To each of the terminals 12 that originated one of the selected loudest signals, the replicator 50 transmits each of the L similar signals except the similar signal corresponding to the signal that originated from the terminal 12 to which the set of L-1 signals is transmitted. Instead of replicating the incoming L signals, the replicator 50 can multicast the incoming signals to the terminals 12, with or without transmitting the received L signals to one or more of the terminals 12.

Other embodiments are within the scope and spirit of the appended claims. For example, the terminals 12 could be configured to transmit more than one signal. Also, the system 10 can be adapted for video conferencing. In this case, the terminals may be configured to provide and display video images. A video image provided to the N terminals may be from the terminal of the loudest user, or multiple images may be provided to from the terminals of the L loudest users to the N terminals. In either case, the terminal providing an image to be provided to other terminals need not receive the image from the conference bridge.

What is claimed is:
1. A conferencing system comprising:
an input configured to receive N encoded speech signals from N terminals; and
a signal processing arrangement configured to determine L encoded signals, of the N encoded speech signals, each indicative of an amount of sound that is louder than amounts of sound indicated by signals of the N encoded signals other than the L signals, the signal processing arrangement being further configured to produce at least N minus L sets of signals similar to the L signals and to transmit at least a set of the similar signals toward each of the terminals other than the terminals from which the L signals were received;
wherein the signal processing arrangement is configured to transmit the signals toward the terminals in an unmixed format.

2. The system of claim 1 wherein the signal processing arrangement is configured to determine the L signals based on amounts of energy in the N signals.

3. The system of claim 2 wherein the signal processing arrangement is configured to transmit a reduced set of signals toward each of the terminals from which the L signals are received, the reduced set including the L similar signals minus the signals similar to the signals received from the terminals toward which the reduced set is being transmitted.

4. A conferencing system comprising:
an input configured to receive N encoded speech signals from N terminals; and
a signal processing arrangement configured to determine L encoded signals, of the N encoded speech signals, each indicative of an amount of sound that is louder than amounts of sound indicated by signals of the N encoded signals other than the L signals, the signal processing arrangement being further configured to produce at least N minus L sets of signals similar to the L signals and to transmit at least a set of the similar signals toward each of the terminals other than the terminals from which the L signals were received;
wherein the N signals include packets having data portions and headers, and the signal processing arrangement is configured to alter the headers of the packets to transmit the packets toward appropriate terminals.

5. A method comprising:
receiving N encoded first telecommunications signals from N terminals;
selecting L loudest signals from the N signals;
producing second telecommunications signals that are similar to the L signals; and
transmitting the second signals toward the terminals other than the terminals from which the L signals were received;
wherein the second signals are transmitted toward the terminals in an unmixed format.

6. The method of claim 5 further comprising determining the L signals based upon amounts of energy in the N signals.

7. The method of claim 5 further comprising transmitting, toward each of the terminals from which the L signals were received, the second signals minus each of the second signals similar to the signals received from the respective terminals.

8. A method comprising:
receiving N encoded first telecommunications signals from N terminals;
selecting L loudest signals from the N signals;
producing second telecommunications signals that are similar to the L signals; and
transmitting the second signals toward the terminals other than the terminals from which the L signals were received;
wherein the first signals contain RTP packets having data portions and headers, the method further comprising altering at least some of the headers to produce the second signals.

9. The method of claim 5 wherein L equals one.

10. A conferencing system comprising:
an input configured to receive N encoded first speech signals from N terminals;
means for selecting L loudest signals from the N signals and producing second telecommunications signals that are similar to the L signals; and
an output device configured to transmit, toward the terminals, the second signals;
wherein the output device is configured to transmit the second signals in an unmixed format toward the terminals.

11. The system of claim 10 wherein the output device is configured to transmit the second signals except the second signals, if any, associated with the first signals received from the respective terminals toward which the second signals are transmitted.

12. The system of claim 10 wherein L equals one.

13. A computer program product, residing on a computer-readable medium, comprising instructions for causing a computer to:
receive N encoded first telecommunications signals from N terminals;
select L loudest signals from the N signals;
produce second telecommunications signals that are similar to the L signals; and
transmit the second signals toward the terminals from which the signals of the N signals other than the L signals were received;
wherein the instructions for causing the computer to transmit the second signals are configured to cause the computer to transmit the second signals toward the terminals in an unmixed format.

14. The computer program product of claim 13 further comprising instructions for causing a computer to determine the L signals based upon amounts of energy in the N signals.

15. The computer program product of claim 13 further comprising instructions for causing a computer to transmit, toward each of the terminals from which the L signals were received, the second signals minus the second signal similar to the signal received from the respective terminal.

16. A computer program product, residing on a computer-readable medium, comprising instructions for causing a computer to:
receive N encoded first telecommunications signals from N terminals;
select L loudest signals from the N signals;
produce second telecommunications signals that are similar to the L signals; and
transmit the second signals toward the terminals from which the signals of the N signals other than the L signals were received;
wherein the first signals contain RTP packets having data portions and headers, the computer program product further comprising instructions for causing a computer to alter at least some of the headers to produce the second signals.

* * * * *